US008014589B2

(12) United States Patent
Andres Del Valle

(10) Patent No.: US 8,014,589 B2
(45) Date of Patent: Sep. 6, 2011

(54) TRANSFORMING A SUBMITTED IMAGE OF A PERSON BASED ON A CONDITION OF THE PERSON

(75) Inventor: Ana Cristina Andres Del Valle, Antibes (FR)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/851,076

(22) Filed: Aug. 5, 2010

(65) Prior Publication Data

US 2011/0064331 A1     Mar. 17, 2011

Related U.S. Application Data

(63) Continuation of application No. 11/671,751, filed on Feb. 6, 2007, now Pat. No. 7,792,379.

(51) Int. Cl.
*G06K 9/00* (2006.01)
(52) U.S. Cl. ........ 382/154; 382/274; 382/275; 382/278; 358/537; 358/538; 358/463
(58) Field of Classification Search .................. 382/274, 382/275, 278; 358/537, 538, 463
See application file for complete search history.

(56) References Cited

U.S. PATENT DOCUMENTS

| | | | |
|---|---|---|---|
| 5,719,951 A | 2/1998 | Shackleton et al. | |
| 6,006,126 A | 12/1999 | Cosman | |
| 6,430,430 B1 * | 8/2002 | Gosche | 600/410 |
| 6,640,145 B2 * | 10/2003 | Hoffberg et al. | 700/83 |
| 6,792,418 B1 | 9/2004 | Binnig et al. | |
| 6,819,790 B2 * | 11/2004 | Suzuki et al. | 382/156 |
| 6,850,252 B1 * | 2/2005 | Hoffberg | 715/716 |
| 6,919,892 B1 * | 7/2005 | Cheiky et al. | 345/473 |
| 7,006,881 B1 * | 2/2006 | Hoffberg et al. | 700/83 |
| 7,027,054 B1 * | 4/2006 | Cheiky et al. | 345/473 |
| 7,062,093 B2 * | 6/2006 | Steger | 382/216 |
| 7,103,203 B2 | 9/2006 | Deschamps | |
| 7,184,814 B2 * | 2/2007 | Lang et al. | 600/416 |
| 7,199,767 B2 | 4/2007 | Spero | |
| 7,213,766 B2 * | 5/2007 | Ryan et al. | 235/492 |
| 7,242,988 B1 * | 7/2007 | Hoffberg et al. | 700/28 |
| 7,289,574 B2 * | 10/2007 | Parolari | 375/295 |
| 7,309,315 B2 * | 12/2007 | Kullok et al. | 600/558 |
| 7,358,502 B1 * | 4/2008 | Appleby et al. | 250/370.14 |
| 7,374,536 B1 * | 5/2008 | Taylor | 600/300 |
| 7,627,154 B2 * | 12/2009 | Luo et al. | 382/128 |
| 7,854,705 B2 * | 12/2010 | Pawluczyk et al. | 600/562 |

OTHER PUBLICATIONS

Danino, Udy et al., Algorithm for Facial Weight-Change, Proc. 11th IEEE International Conference on Electronics, Circuits and Systems (ICECS2004), Tel Aviv, Israel, 2004, pp. 1-4. Rowland, D.A., et al., Transforming Facial Images in 2 and 3-D, Imagina 97-Conferences-ACTES/Proceedings, Feb. 1997, Monte Carlo, pp. 1-12.

* cited by examiner

*Primary Examiner* — Yosef Kassa
(74) *Attorney, Agent, or Firm* — Fish & Richardson P.C.

(57) ABSTRACT

Apparatuses, computer media, and methods for altering a submitted image of a person. The submitted image is transformed in accordance with associated data regarding the person's condition. Global data may be processed by a statistical process to obtain cluster information, and the transformation parameter is then determined from cluster information. The transformation parameter is then applied to a portion of the submitted image to render a transformed image. A transformation parameter may include a texture alteration parameter, a hair descriptive parameter, or a reshaping parameter. An error measure may be determined that gauges a discrepancy between a transformed image and an actual image. A transformation model is subsequently reconfigured with a modified model in order to reduce the error measure. Also, the transformation model may be trained to reduce an error measure for the transformed image.

21 Claims, 13 Drawing Sheets

US 8,014,589 B2

TRANSFORMING A SUBMITTED IMAGE OF A PERSON BASED ON A CONDITION OF THE PERSON

CROSS-REFERENCE TO RELATED APPLICATION

This application is a continuation of U.S. application Ser. No. 11/671,751, filed Feb. 6, 2007, now allowed, the entire contents of which are hereby incorporated by reference.

FIELD OF THE INVENTION

This invention relates to altering a submitted image of a person. More particularly, the invention provides a platform for transforming the image in accordance with a submitted image and associated data regarding the person's condition.

BACKGROUND OF THE INVENTION

Excessive body weight is a major cause of many medical illnesses. With today's life style, people are typically exercising less and eating more. Needless to say, this life style is not conducive to good health. For example, it is acknowledged that type-2 diabetes is trending to epidemic proportions. Obesity appears to be a major contributor to this trend.

On the other hand, a smaller proportion of the population experiences from being underweight. However, the effects of being underweight may be even more divesting to the person than to another person being overweight. In numerous related cases, people eat too little as a result of a self-perception problem. Anorexia is one affliction that is often associated with being grossly underweight.

While being overweight or underweight may have organic causes, often such afflictions are the result of psychological issues. If one can objectively view the effect of being underweight or underweight, one may be motivated to change one's life style, e.g., eating in a healthier fashion or exercising more. Viewing a predicted image of one's body if one continues one's current life style may motivate the person to live in a healthier manner.

The above discussion underscores a market need to provide a computing platform for transforming a submitted image in order to project the image in accordance with a specified condition of a person.

BRIEF SUMMARY OF THE INVENTION

Embodiments of invention provide apparatuses, computer media, and methods for altering a submitted image of a person. The submitted image is transformed in accordance with associated data regarding the person's condition.

With an aspect of the invention, a submitted image and associated data of a person's condition is obtained. A transformation parameter is determined and applied to a portion of the submitted image to render a transformed image.

With another aspect of the invention, an error measure is determined that gauges a discrepancy between a transformed image and an actual image. A transformation model is reconfigured with a modified model in order to reduce the error measure.

With another aspect of the invention, a transformation parameter includes a deformation vector. A mesh with a plurality of vertices is formed that overlays a portion of a submitted image. The deformation vector is applied to a vertex to obtain a transformed vertex to transform the mesh. A transformed image is rendered from the transformed mesh.

With another aspect of the invention, a transformation model is trained to reduce an error measure for the transformed image.

With another aspect of the invention, global data is processed by a statistical process to obtain cluster information. A transformation parameter is then determined from cluster information.

With another aspect of the invention, a transformation parameter includes a texture alteration parameter, a hair descriptive parameter, or a reshaping parameter. The transformation parameter is determined and subsequently applied to a portion of the submitted image.

With another aspect of the invention, a client-server configuration enables a requester to provide a submitted image with associated data about a person. The server returns a transformed image to the requester.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
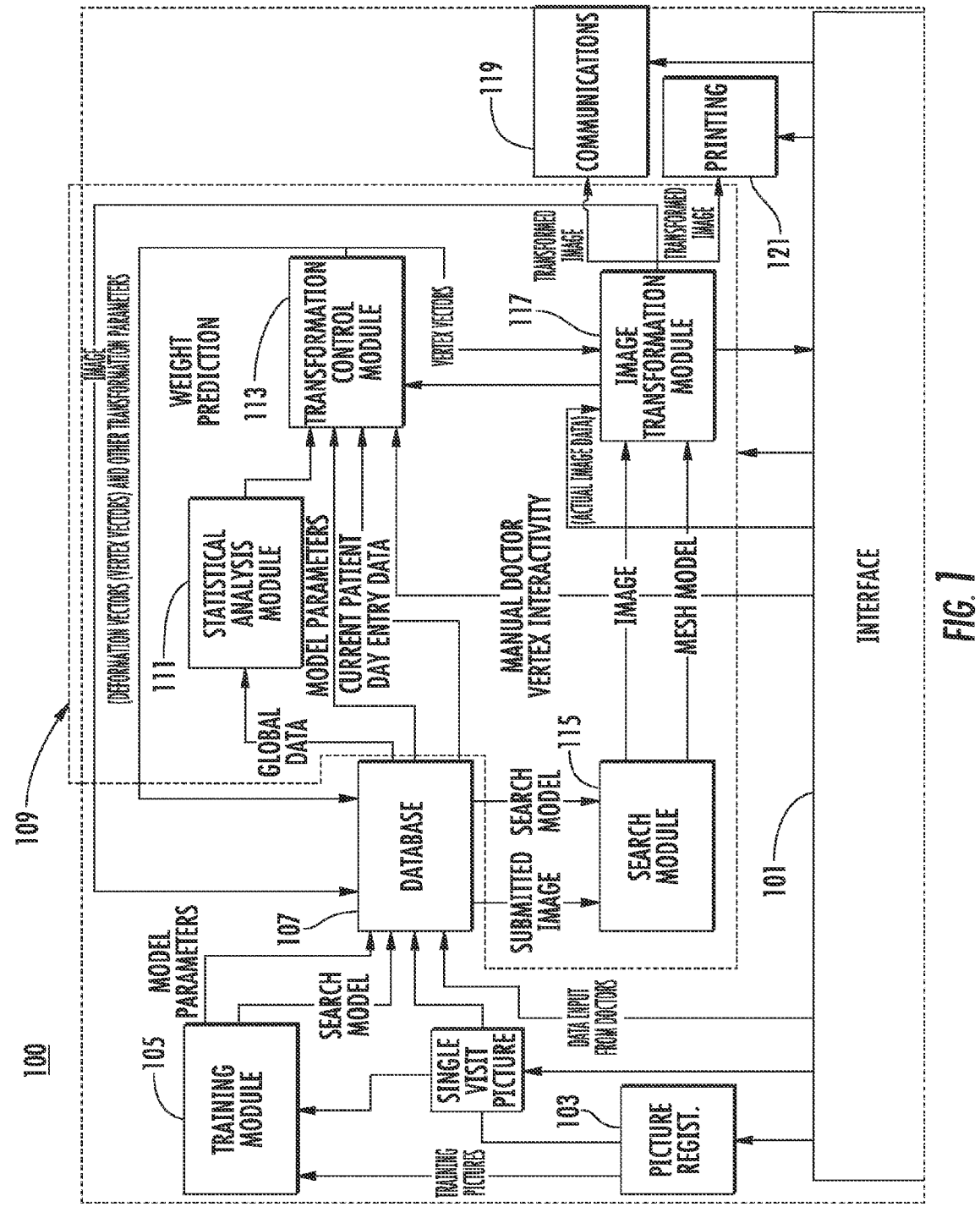
FIG. 1 shows an architecture for transforming a submitted image of a person in accordance with an embodiment of the invention.
Figure 10:
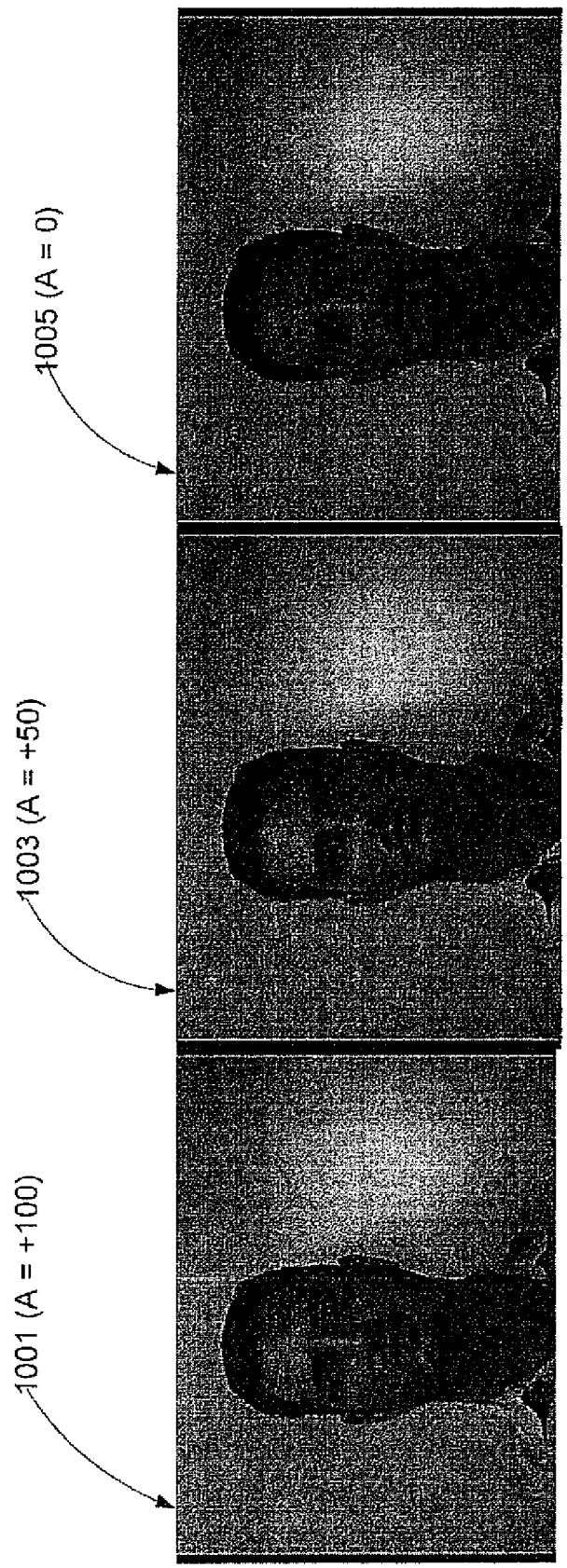
FIG. 10 shows visual results for altering a face image in accordance with an embodiment of the invention.
Figure 11:
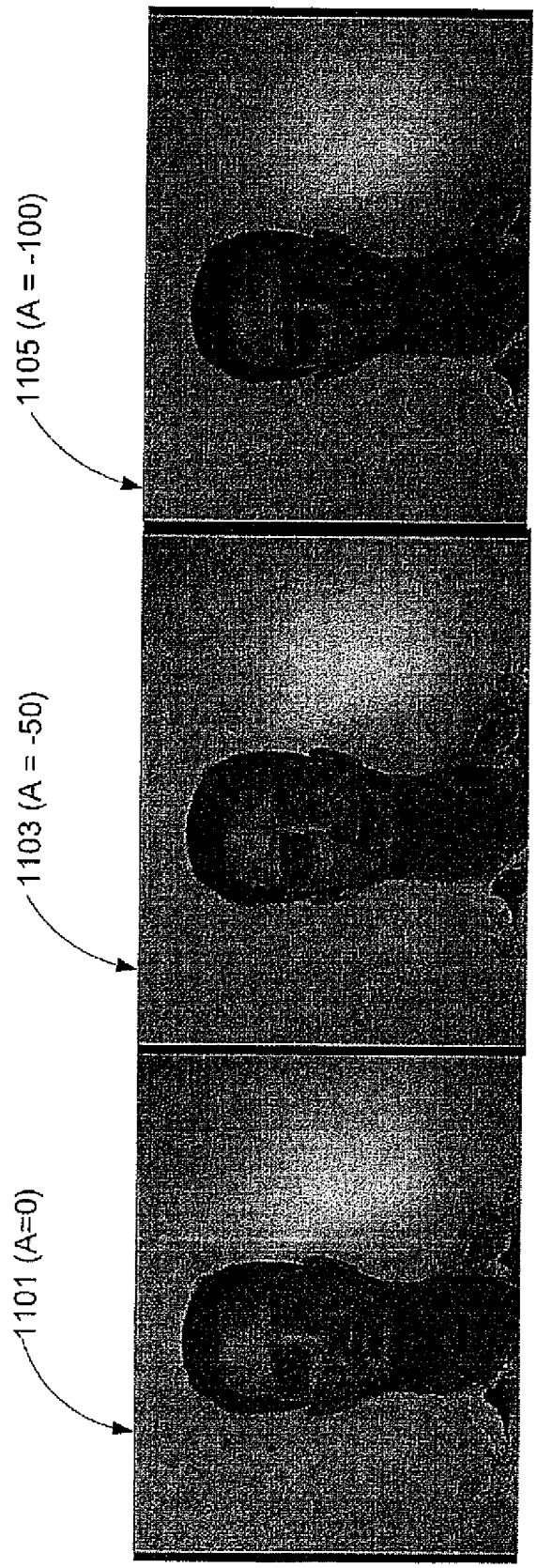
FIG. 11 shows additional visual results for altering a face image in accordance with an embodiment of the invention.

FIG. 1 shows system 100 for transforming a submitted image of a person in accordance with an embodiment of the invention. (FIGS. 10 and 11 show examples of reshaped (transformed) images, in which the face is either fattened or thinned.) The submitted image from interface 101 is registered by picture registration module 103 so that a person is associated with the submitted image. In addition, associated data is entered from interface 101 that provides information about the person. For example, the associated data may be indicative of a health condition (e.g., anorexia or overweight family history), age, current weight, height, sex, ethnic group (e.g., Caucasian of English extraction or Asian of Chinese extraction) and dietary information.

With embodiments of the invention, system 100 may transform (e.g., reshape) a submitted image of a person for different objectives. For example, as will be discussed in greater detail, system 100 may thin or fatten the face of the person to show the effects of one's diet. Also, system 100 may provide guidance to patients in determining the benefits of cosmetic surgery or may project the effects of aging on a person (e.g., in support of a missing person's investigation. Embodiments of the invention also support other forecasting-health scenarios. Other scenarios include the evolution of face appearance while smoking and the evolution of stains on the face resulting from sun exposure. Embodiments of the invention can also forecast the effect of a drug taken for some illness. While photographic images can be used, other types of images (e.g., medical imaging including MRI, x-ray, ultrasound, and 3D) may be analyzed for different affected body organs (e.g., heart, lungs, kidney, and liver).

With an embodiment of the invention, system 100 transforms a portion of the submitted image in accordance with the associated data provided from interface 101. The portion may be specified as the head, torso, or entire body of a person.

With an embodiment of the invention, system 100 may be trained through training module 105 to configure a transformation model as will be discussed. After training, a picture (corresponding to a submitted image) and associated data is provided to database 107. Database 107 accesses a search model and model parameters that best match the submitted image. For example, a search model may include a mesh having points (vertices) as selected points of the face (e.g., shown in FIG. 5). The mesh may vary based on the associated data, e.g., the ethnic group or the sex of the person.

Figure 5:
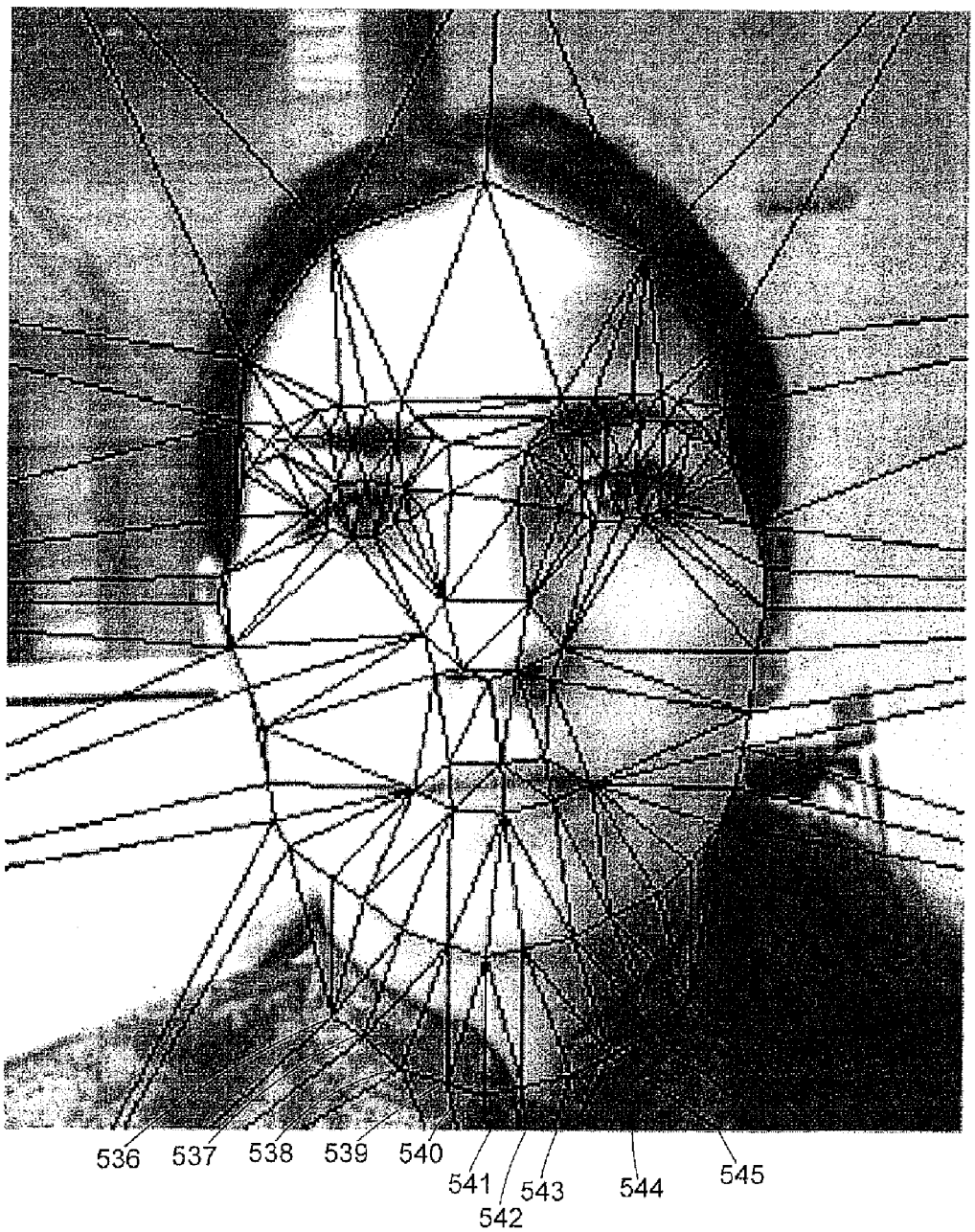
FIG. 5 shows a mesh that is superimposed in a face image in accordance with an embodiment of the image.

Search module 115 obtains the image and the search model from database 107 and places the vertices on the portion of the image to form a mesh. As shown in FIG. 5, an exemplary mesh is formed for the face of the person. The vertices may be placed differently on the image based on the search model, which may depend on the ethnic group and the sex of the person. Search module 115 provides the image and the associated mesh to image transformation module 117.

Figure 8:
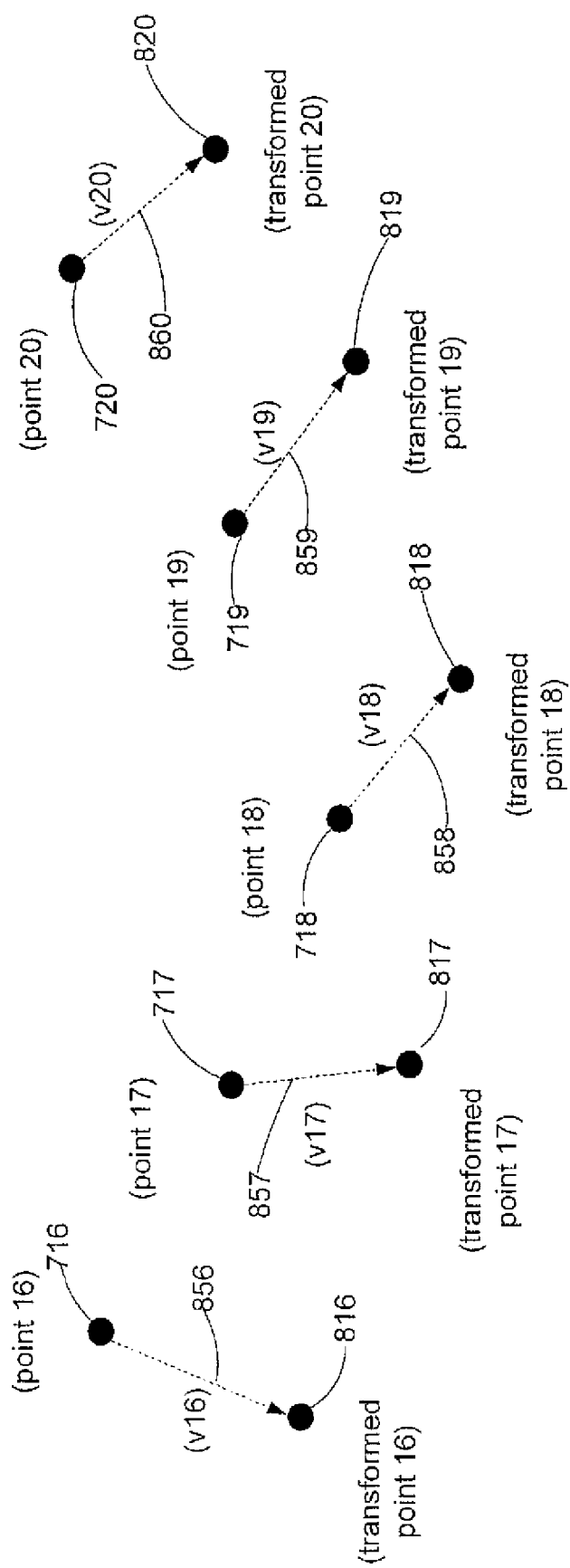
FIG. 8 shows a transformation of points on a mesh in accordance with an embodiment of the invention.

In order for image transformation module 117 to transform the portion of the submitted image, transformation control module 113 determines vertex vectors (deformation vectors) for transforming the vertices of the mesh to form a transformed mesh. (As will be discussed with FIG. 5, the mesh is associated with corresponding texture from the picture where the alteration is taking place. When the mesh has been transformed, computer graphics software includes the associated texture to render the transformed image. Also, as will be discussed, FIG. 8 shows vertices that are transformed in accordance with determined deformation vectors.) The transformed image may be provided to a user through interface 101, printer 121, or communications channel 119.

Transformation control module 113 determines the deformation vectors from entry data (as may be contained in the associated data provided by a doctor) in accordance with an embodiment of the invention. (Embodiments of the invention may also include changes in texture, pattern, color and any other image characteristic.) For example, entry data may include specific information about a patient, e.g., the patient's weight loss during a period of time, the caloric input of the patient, and other dietary information. Also, as shown in FIG. 1, transformation control module 113 may be provided model parameters by training modules 105. In addition, the patient may be associated to a cluster by statistical analysis module 111. Module 111 may determine the associated cluster from the associated data from doctor that may include the age, weight, height, and ethnic group of the patient. A plurality of clusters may be formed based on the values of different attributes such age, weight, and ethnic group. A population may be assigned to the plurality of clusters based on selected attributes.

Figure 9:
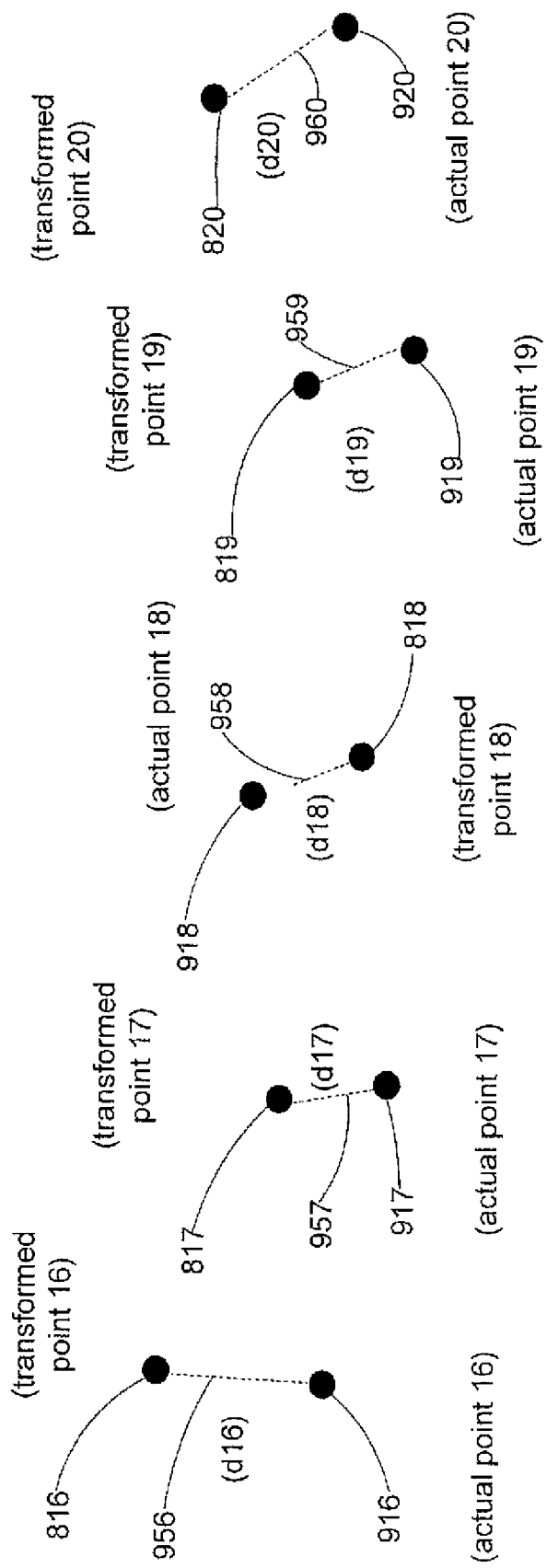
FIG. 9 shows a resulting error from transforming points on a mesh in accordance with an embodiment of the invention.

With an embodiment of the invention, system 100 is adaptive so that the transformation parameters for the transformation model may be modified in order to reduce an error measure between the transformed image and an actual image For example, system 100 may provide a transformed image that predicts (projects) the image of a person's face after one year using the associated data from a doctor. The transformed image may be compared with the actual image (if one is available) after one year to determine an error measure, and a model parameter may be subsequently modified in order to reduce the error for images that are submitted to system 100. (As will be discussed, FIG. 9 provides an approach for determining an error measure.) For example, the deformation factor w (as discussed with EQs. 4A-4D) may be modified. The above error analysis may be implemented within one of the modules as shown in FIG. 1 (e.g., module 117) or may be implemented with a separate module (e.g., an error analysis module not shown in FIG. 1).

Embodiments of the invention also support training module 105 that configures transformation models and search models in order to obtain a transformed images that have an acceptable error with respect to actual data (e.g., an actual image). For example, a submitted image, associated data, and corresponding actual image are provided to training module 105. The submitted image is transformed and compared to the actual image. Model parameters for the transformation model are then adjusted to minimize an error measure. In order to train system 100, the process can be repeated a number of times until an acceptable error is obtained.

With embodiments of the invention, search module 115 may use a search model in which a search function of an Active Appearance Model (AAM) determines the vertices of the mesh (as will be discussed). A transformation model may be represented as a set of equations (e.g., EQs. 1-5B.) The set of equations may be specified by the model parameters (e.g., the constants contained in EQs. 1-5B.) Transformation control module 113 uses the transformation model to determine a deformation vector (that transforms a corresponding vertex of the mesh). The deformation vector comprises a weight value A, a scale factor s, a deformation factor w, and a direction vector ii as expressed in EQs. 1-5B and as will be later discussed.

With system 100 one can introduce images (photos or medical-specific images) in order to automatically forecast an evolution of a person's condition. Moreover, the results provided by system 100 can be improved by introducing feedback from experts (e.g., doctors nutritionist, surgeons) if improvement is desired.

Figure 2:
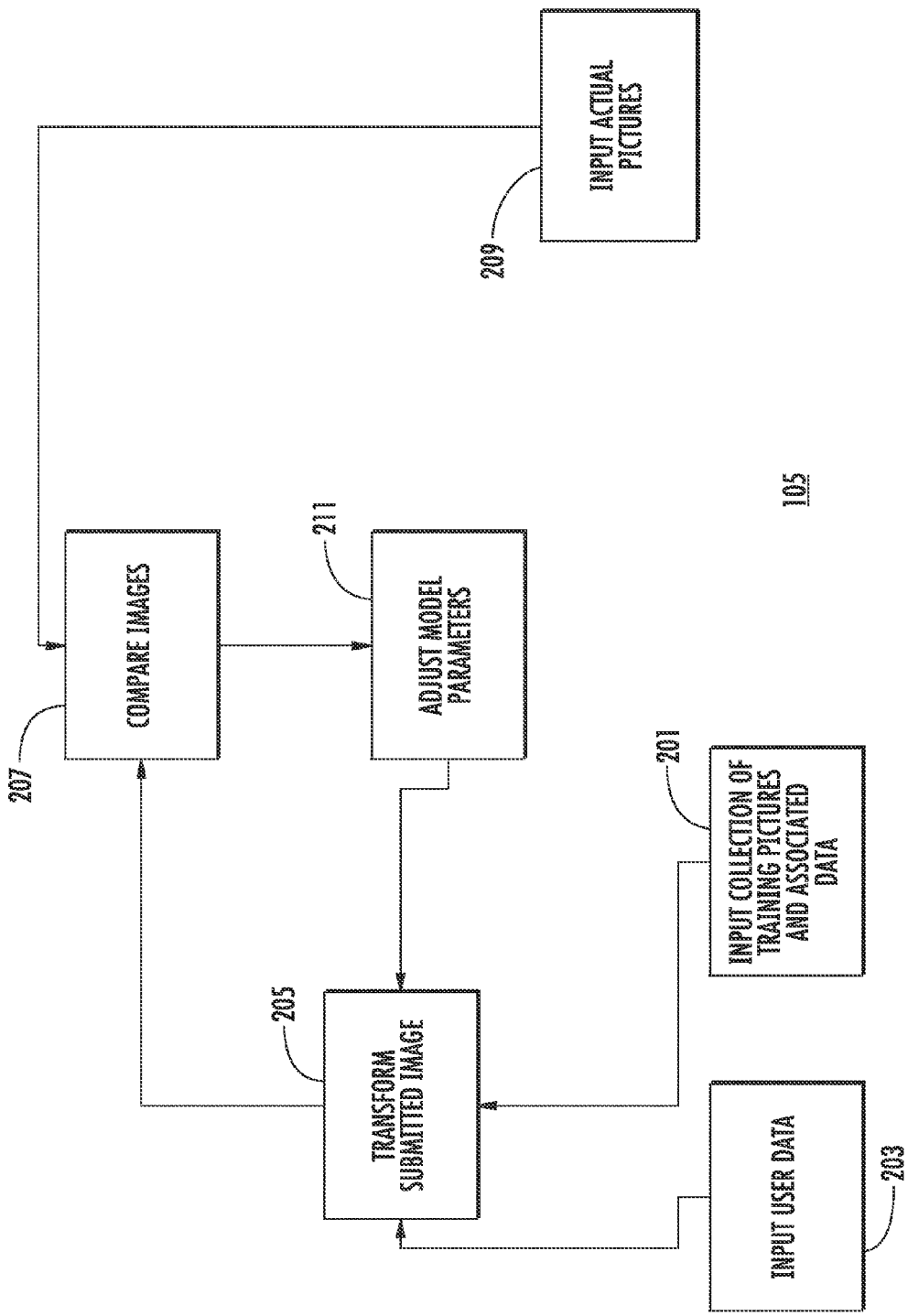
FIG. 2 shows a training process for configuring a transformation process that alters a submitted image of a person in accordance with an embodiment of the invention.

FIG. 2 shows training module 105 for configuring a transformation process that alters a submitted image of a person in accordance with an embodiment of the invention. Transform module 205 transforms an image of training picture 201 in accordance with input user data 203 that specifies a given condition affecting. For example, a user may specify a degree of thinning for a person. Comparator 207 compares the transformed image with an image from a corresponding actual picture 209, which shows a person being affected by the given condition to determine an error measure. (An example of determining an error measure is discussed with FIG. 9.) This operation may be repeated a plurality of times to better determine the accuracy of transform module 205. (Typically, the greater the number of training pictures (with corresponding actual pictures), the greater the accuracy of transformation.) When the accuracy (as gauged by the error measure) is determined, adjustment module 211 adjusts model parameters for transforming a submitted image.

Figure 3:
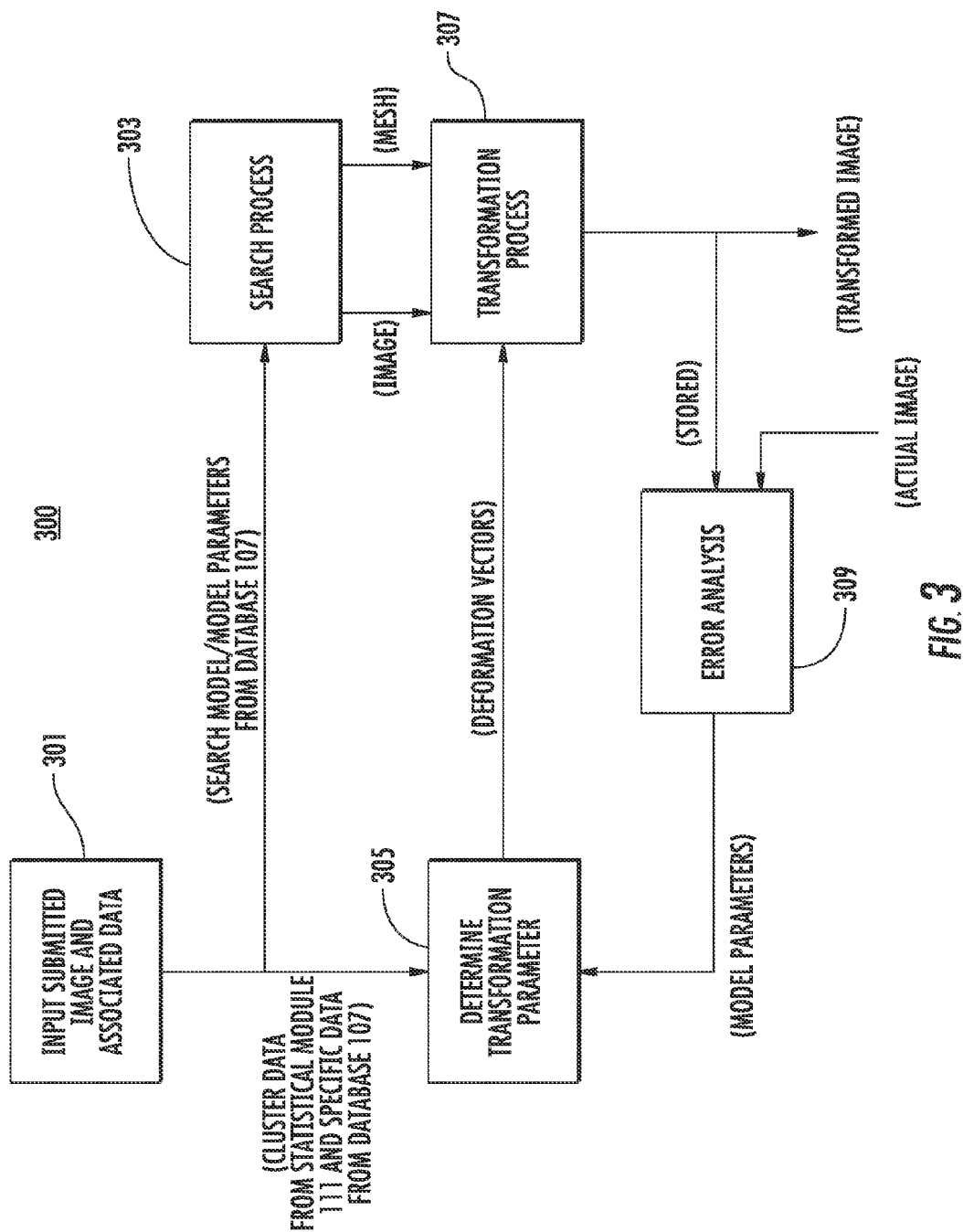
FIG. 3 shows a process that modifies a model parameter by analyzing an error measure between a transformed image and an actual image in accordance with an embodiment of the invention.

FIG. 3 shows process 300 that modifies a model parameter by analyzing an error measure between a transformed image and an actual image in accordance with an embodiment of the invention. System 100 executes process 300 to update model parameters after system 100 has been trained by process 105 (as shown in FIG. 2).

With embodiments of the invention, the execution of process 300 may be distributed over a plurality of modules as shown in FIG. 1. In step 301, a submitted image and associated data is entered and stored in database 107. In step 303, database 107 provides the appropriate search model and the submitted image to search module 115 to obtain the associated mesh.

In step 305, transformation control module 113 determines transformation parameters (e.g., deformation vectors) from cluster data and specific data about the person in accordance with the selected transformation model as identified by database 107. Image transformation module 117 subsequently processes the transformation parameters, submitted parameter, and mesh in step 307.

Even though system 100 may have been previously trained with training module 105, system 100 can subsequently update model parameters through error analysis process 309. Image transformation module 117 transforms the submitted image to obtain a transformed image as discussed above. If an actual image of the person is available at a time corresponding to the projected time of the transformed image, error analysis process 309 can compare the actual image with the transformed image. (Typically, the transformed image is stored in database 107 and later retrieved when the actual image is available. As an example, the results of every $N^{th}$ submitted image may be evaluated with respect to the actual image that is available after the projected time.) Error analysis process 309 then adjusts the model parameters in order to reduce an error measure (e.g., the error measure illustrated with FIG. 9).

Figure 4:
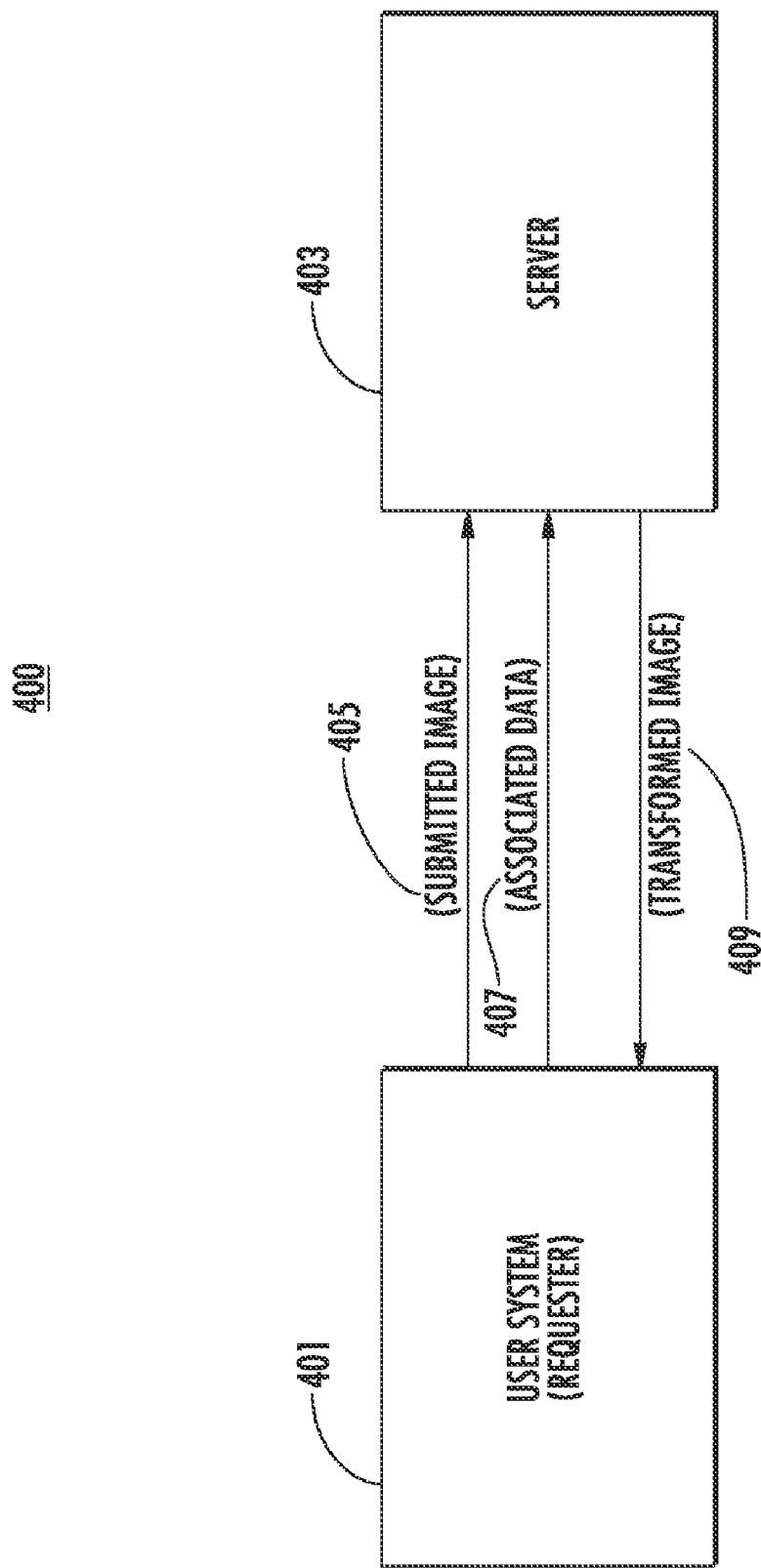
FIG. 4 shows a client-server configuration for transforming a submitted image of a person in accordance with an embodiment of the invention.

FIG. 4 shows client-server configuration 400 for transforming a submitted image of a person in accordance with an embodiment of the invention. While system 100 may operate in a stand-alone configuration, configuration enables requester (client) 401 to request that server 403 process submitted image 405 in accordance with associated data 407 to obtain transformed image 409. Server 403 is typically trained before processing submitted image 405. With embodiments of the invention, server 403 includes database 107 and modules 111-117 as shown in FIG. 1. However, because of privacy concerns, requester 401 may restrict information that identifies the person whose image is being submitted. Moreover, server 403 may not store submitted image 405 or transformed image 409.

FIG. 5 shows a mesh that is superimposed in a face image in accordance with an embodiment of the image. As will be discussed, an algorithm fattens or thins the face image in accordance with an embodiment of the invention. Points along the face, neck, and image boundary are determined in order to form the mesh. As will be further discussed, the algorithm alters the facial contour and then reshapes (transforms) the area around the neck. (Points 536-545 will be discussed in a later discussion.) The altered image is rendered by using the points as vertices of the mesh. While a mesh is one example for reshaping an image, other embodiments of the invention may change other characteristics of an image to forecast the evolution of a person.

This mesh is associated to its corresponding texture from the picture where the alteration is taking place. The corners and four points along each side of the picture (as shown in FIG. 15 are also considered as part of the mesh. Computer graphics software API (Application Programming Interface) is used to render the altered image (e.g., as shown in FIGS. 10-11). OpenGL API is an example of computer graphics software that may be used to render the altered image.

Figure 6:
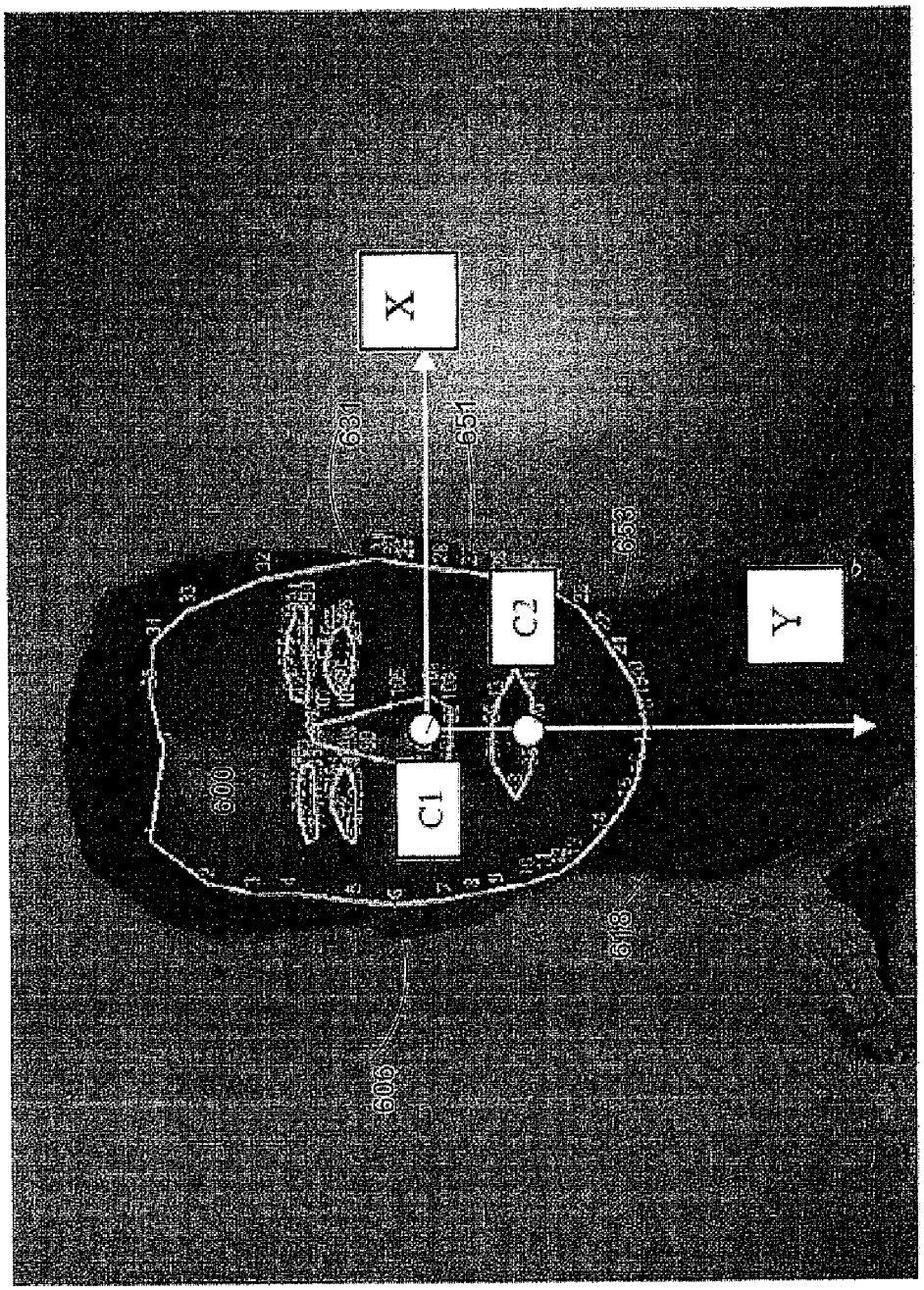
FIG. 6 shows a set of points for altering a face image in accordance with an embodiment of the invention.

FIG. 6 shows a set of points (including points 600, 606, 618, and 631 which will be discussed in further detail) for altering a face image in accordance with an embodiment of the invention. (Please note that FIG. 6 shows a plurality of points, which correspond to the vertices of the mesh.) Points 600, 606, 618, and 631 are only some of the plurality of points. An embodiment of the invention uses the search function of a software technique called Active Appearance Model (AAM), which utilizes a trained model. (Information about AAM is available at http://www2.imm.dtu.dk/~aam and has been utilized by other researchers.) However, points 600, 606, 618, and 631 may be determined with other approaches, e.g., a manual process that is performed by medical practitioner manually entering the points. With an embodiment of the invention, the trained model is an AMF file, which is obtained from the training process. For the training the AAM, a set of images with faces is needed. These images may belong to the same person or different people. Training is typically dependent on the desired degree of accuracy and the degree of universality of the population that is covered by the model. With an exemplary embodiment, one typically processes at least five images with the algorithm that is used. During the training process, the mesh is manually deformed on each image. Once all images are processed, the AAM algorithms are executed over the set of points and images, and a global texture/shape model is generated and stored in an AMF file. The AMF file permits an automatic search in future images not belonging to the training set. With an exemplary embodiment, one uses the AAM API to generate Appearance Model Files (AMF). Embodiments of the invention also support inputting the plurality of points through an input device as entered by a user. A mesh is superimposed on the image at points (e.g., the set of points shown in FIG. 6) as determined by the trained process.

Figure 7:
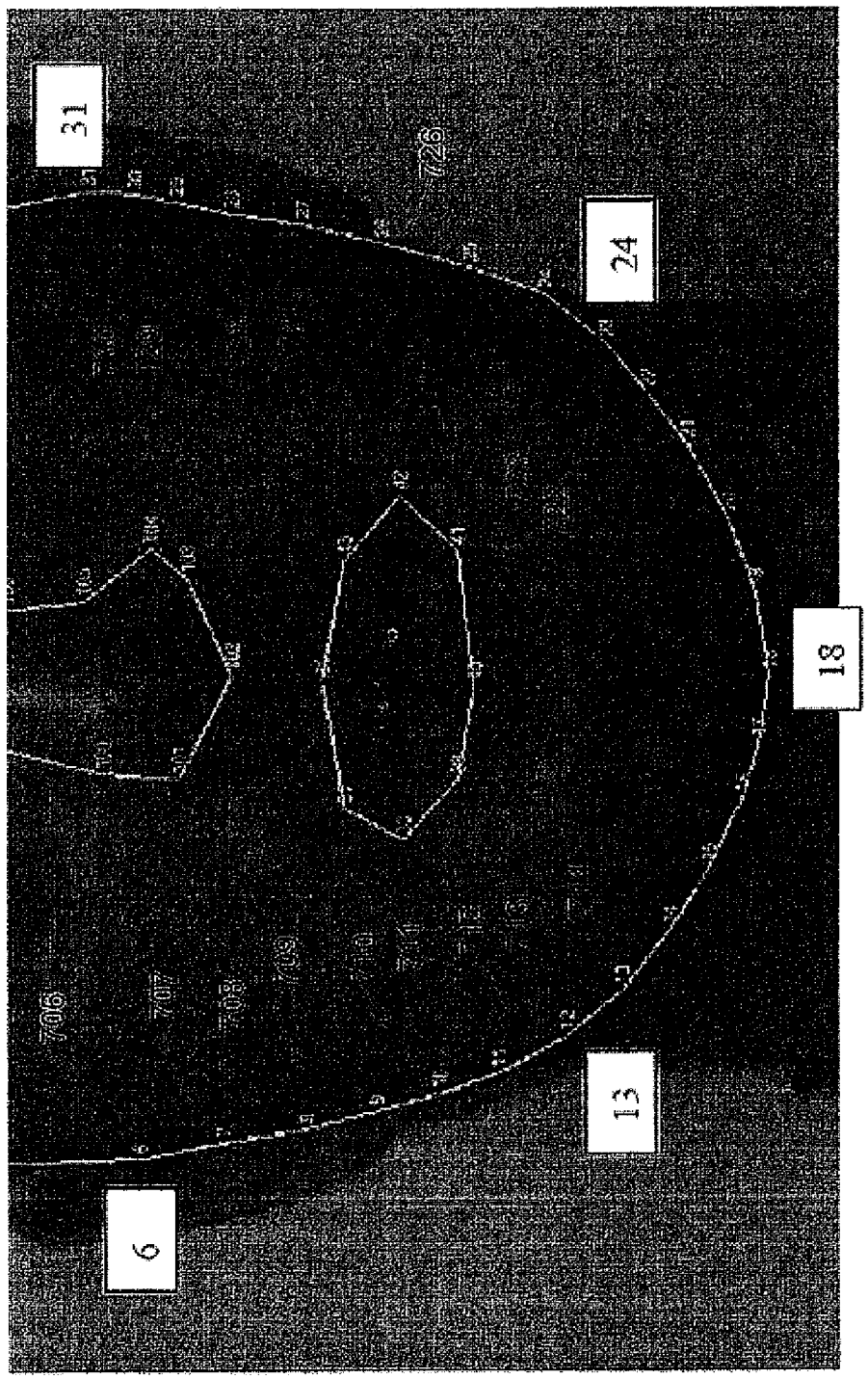
FIG. 7 shows controlling points for face alteration in accordance with an embodiment of the invention.

FIG. 6 also shows the orientation of the x and y coordinates of the points as shown in FIGS. 5-7.

FIG. 7 shows controlling points 706-731 for face alteration in accordance with an embodiment of the invention. (Points 706, 718, and 731 correspond to points 606, 618, and 631 respectively as shown in FIG. 6.) Points 706-731, which correspond to points around the cheeks and chin of the face, are relocated (transformed) for fattening or thinning a face image to a desired degree. With an embodiment of the invention, only a proper subset (points 706-731) of the plurality of points (as shown in FIG. 6 are relocated. (With a proper subset, only some, and not all, of the plurality points are included.)

In the following discussion that describes the determination of the deformation vectors for reshaping the face image, index i=6 to index i=31 correspond to points 306 to points 731, respectively. The determined deformation vectors are added to points 306 to points 731 to re-position the point, forming a transformed mesh. A reshaped image is consequently rendered using the transformed mesh.

In accordance with embodiments of the invention, deformation vector correspond to a product of four elements (factors):

$$\vec{v}_d = \vec{u} \cdot s \cdot w \cdot A \quad (EQ. 1)$$

where A is the weight value factor, s is the scale factor, w is the deformation factor, and $\vec{u}$ is the direction vector. In accordance with an embodiment of the invention:

Weight value factor [A]: It determines the strength of the thinning and fattening that we wan to apply.

$$A > 0 \text{ fattening} \quad (EQ. 2A)$$

$$A < 0 \text{ thinning} \quad (EQ. 2B)$$

$$A = 0 \text{ no change} \quad (EQ. 2C)$$

Scale factor [s]. It is the value of the width of the face divided by B. One uses this factor to make this vector calculation independent of the size of the head we are working with. The value of B will influence how the refined is the scale of the deformation. It will give the units to the weight value that will be applied externally.

$$s = \frac{|x_{31} - x_6|}{B} \quad (EQ. 3)$$

Deformation factor [w]. It is calculated differently for different parts of cheeks and chin. One uses a different equation depending on which part of the face one is processing:

$$i \in [6\text{-}13] \quad w_i = \frac{2}{3} \frac{1}{|x_6 - x_{13}|} |x_i - x_{C1}| + \frac{1}{3} \quad (EQ. 4A)$$

$$i \in [14\text{-}18] \quad w_i = -\frac{1}{|x_{13} - x_{18}|^2} |x_i - x_{C1}|^2 + 1 \quad (EQ. 4B)$$

$$i \in [19\text{-}23] \quad w_i = -\frac{1}{|x_{18} - x_{24}|^2} |x_i - x_{C1}|^2 + 1 \quad (EQ. 4C)$$

$$i \in [24\text{-}31] \quad w_i = \frac{2}{3} \frac{1}{|x_{24} - x_{31}|} |x_i - x_{C2}| + \frac{1}{3} \quad (EQ. 4D)$$

Direction vector [$\vec{u}$]: It indicates the sense of the deformation. One calculates the direction vector it the ratio between: the difference (for each coordinate) between the center and our point, and the absolute distance between this center and our point. One uses two different centers in this process: center C2 (point 653 as shown in FIG. 6) for the points belonging to the jaw and center C1 (point 653 as shown in FIG. 6) for the points belonging to the cheeks.

$$i \in [6\text{-}13] \& [24\text{-}31] \quad \vec{u}_i = \frac{x_i - x_{C1}}{|x_i - x_{C1}|} \quad (EQ. 5A)$$

$$i \in [14\text{-}23] \quad \vec{u}_i = \frac{x_i - x_{C2}}{|x_i - x_{C2}|} \quad (EQ. 5B)$$

Neck point-coordinates $x_i$ are based on the lower part of the face, where $$i \in [36\text{-}45] \quad j \in [14\text{-}23] \quad x_i = (x_j, y_i + \text{neck\_height}) \quad (EQ. 6)$$

$$\text{neck\_height} = \frac{y_{18} - y_0}{6} \quad (EQ. 7)$$

where $y_{18}$ and $y_0$ are the y-coordinates of points 618 and 600, respectively, as shown in FIG. 6. Referring back to FIG. 5, index i=36 to i=45 correspond to points 536 to 545, respectively. Index j=14 to j=23 correspond to points 714 to 723, respectively, (as shown in FIG. 3) on the lower part of the face, from which points 536 to 545 on the neck are determined. (In an embodiment of the invention, points 536 to 545 are determined from points 714 to 723 before points 714 to 723 are relocated in accordance with EQs. 1-5.)

The deformation vector ($\vec{v}_{d\_neck}$) applied at points 536 to 545 has two components:

$$\vec{v}_{d\_neck} = (0, y_{d\_neck}) \quad (EQ. 8)$$

$$\text{when } x_i < x_{41} \quad y_{d\_neck_i} = -\frac{(x_i - x_{18})^2}{10 \cdot \left(\frac{x_{24} - x_{13}}{2}\right)^2} \quad (EQ. 9A)$$

$$\text{when } x_i \geq x_{41} \quad y_{d\_neck_i} = \frac{(x_i - x_{18})^2}{10 \cdot \left(\frac{x_{24} - x_{13}}{2}\right)^2} \quad (EQ. 9B)$$

FIG. 8 shows a transformation of points (vertices) on a mesh in accordance with an embodiment of the invention. Points 716-720 are a subset of vertices shown in FIG. 7. Deformation vectors 856-860 are determined by image transformation module 117 in accordance with EQs. 1-5B. Transformed points (transformed vertices) 816-820 are obtained by transforming points 716-720 with corresponding deformation vectors 856-860.

FIG. 9 shows a resulting error from transforming points on a mesh in accordance with an embodiment of the invention. (Embodiments of the invention support other criteria for determining an error measure. For example, an error measure can account for the color, texture, pattern, or shape change of the image.) Transformed points (transformed vertices) 816-820 correspond to points that are shown in FIG. 8. If an actual image is available, actual vertices 916-920 can be determined from a search function as supported by search module 115. Subsequently, distances ($d_i$) 956-960 for each vertex pair consisting of a transformed point and an associated actual point is obtained. One can determine a square error for the transformed image by:

$$\text{square\_error} = \sum_{i=1}^{N} a_i (\text{actual\_vertex} - \text{transformed\_vertex})^2 \quad (EQ. 10)$$

Each weight $a_i$ is adjusted to reflect the relative importance of the vertex pair. (If a vertex pair is not included when determining the square error, the corresponding weight is set to zero. Thus, some or all of the vertices shown in FIG. 7 may be included in the error analysis.) The least square error may be determined by error analysis module 309 (as shown in FIG.

3) by adjusting model parameters (e.g., constants in EQs. 1-5B) that corresponds to reduce the square error to a minimum.

FIG. 10 shows visual results for altering a face image in accordance with an embodiment of the invention. Images 1001 to 1005 correspond to A=+100, A=+50, and A=0 respectively, which correspond to decreasing degrees of fattening.

With an embodiment of the invention, A=+100 corresponds to a maximum degree of fattening and A=−100 corresponds to a maximum degree of thinning The value of A is selected to provide the desired degree of fattening or thinning. For example, if a patient were afflicted anorexia, the value of A would have a negative value that would depend on the degree of affliction and on the medical history and body type of the patient. As another example, a patient may be overeating or may have an unhealthy diet with many empty calories. In such a case, A would have a positive value. A medical practitioner may be able to gauge the value of A based on experience. However, embodiments of invention may support an automated implementation for determining the value of A. For example, an expert system may incorporate knowledge based on information provided by experienced medical practitioners.

FIG. 11 shows additional visual results for altering a face image in accordance with an embodiment of the invention. Images 1101-1105, corresponding to A=0, A=−50 and A=−50 respectively, show the continued reduced sequencing of the fattening (increased thinning). When A=0 (image 1101), the face is shown as it really appears. With A=−50 (image 1103), the face is shows thinning. As A becomes more negative, the effects of thinning is increased.

With embodiments of the invention, medical imaging may be processed in order to determine effects of treatment on an organ. For example, a patient is being treated for pancreatitis (inflammation of pancreas). The doctor is prescribing the patient a drug and wants to compare the evolution of the patient's condition with expected results. The doctor uses ultrasound (or MRI) images to view the pancreas. A mesh is also utilized to track the contour of the pancreas to determine how the pancreas evolves. Feedback from the doctor and the evolution of the patient's condition are utilized to improve future predictions. Moreover, this approach may be extended so that pharmacologists can evaluate the tests of a new drug with the help of experts.

Figure 12:
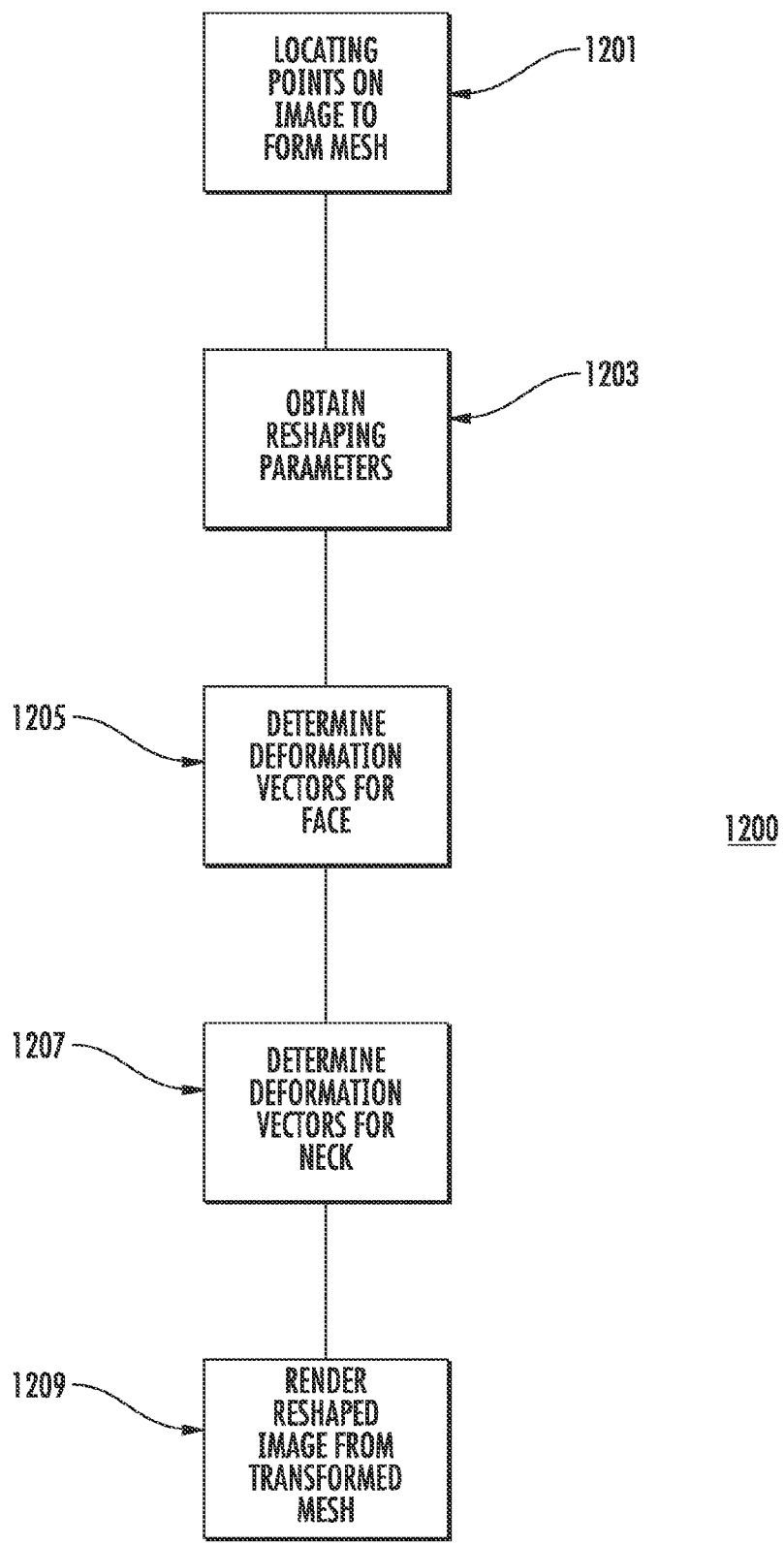
FIG. 12 shows a flow diagram for altering a face image in accordance with an embodiment of the invention.

FIG. 12 shows flow diagram 1200 for altering a face image in accordance with an embodiment of the invention. In step 1201, points are located on the image of the face and neck in order form a mesh. Points may be determined by a trained process or may be entered through an input device by a medical practitioner. In step 1203, reshaping parameters (e.g., a weight value factor A) are obtained. The reshaping factors may be entered by the medical practitioner or may be determined by a process (e.g. an expert system) from information about the person associated with the face image.

In step 1205 deformation vectors are determined and applied to points (e.g. points 706-731 as shown in FIG. 7) on the face. For example, as discussed above, EQs. 1-5. are used to determine the relocated points. In step 1207 deformation vectors are determined (e.g., using EQs. 6-9) and applied to points (e.g., points 536-545 as shown in FIG. 5) on the neck. A transformed mesh is generated from which a reshaped image is rendered using computer graphics software in step 1209.

While FIGS. 5-12 illustrate embodiments of the invention for fattening and thinning a person's face, embodiments of the invention support other types of transformations. For example, not only may vertices of a mesh be transformed to reshape the face, texture components (e.g., wrinkling of the skin associated with aging) may also be transformed. Also, hair attributes (e.g., graying and balding) may be included when forming a transformed image by adding artificial synthetic elements. Other image transformations that may be considered are: texture, pattern and color. Moreover, slight perspective changes may be applied to some of the objects in the images (e.g., face) to rectify the point of view in which the picture has been taken and the point of view in which the transformation model was trained. More than one image may be evaluated at a time if those images give different views from the same face, organ or object (e.g., one can evaluate the evolution of a face from a frontal and a side perspective).

Figure 13:
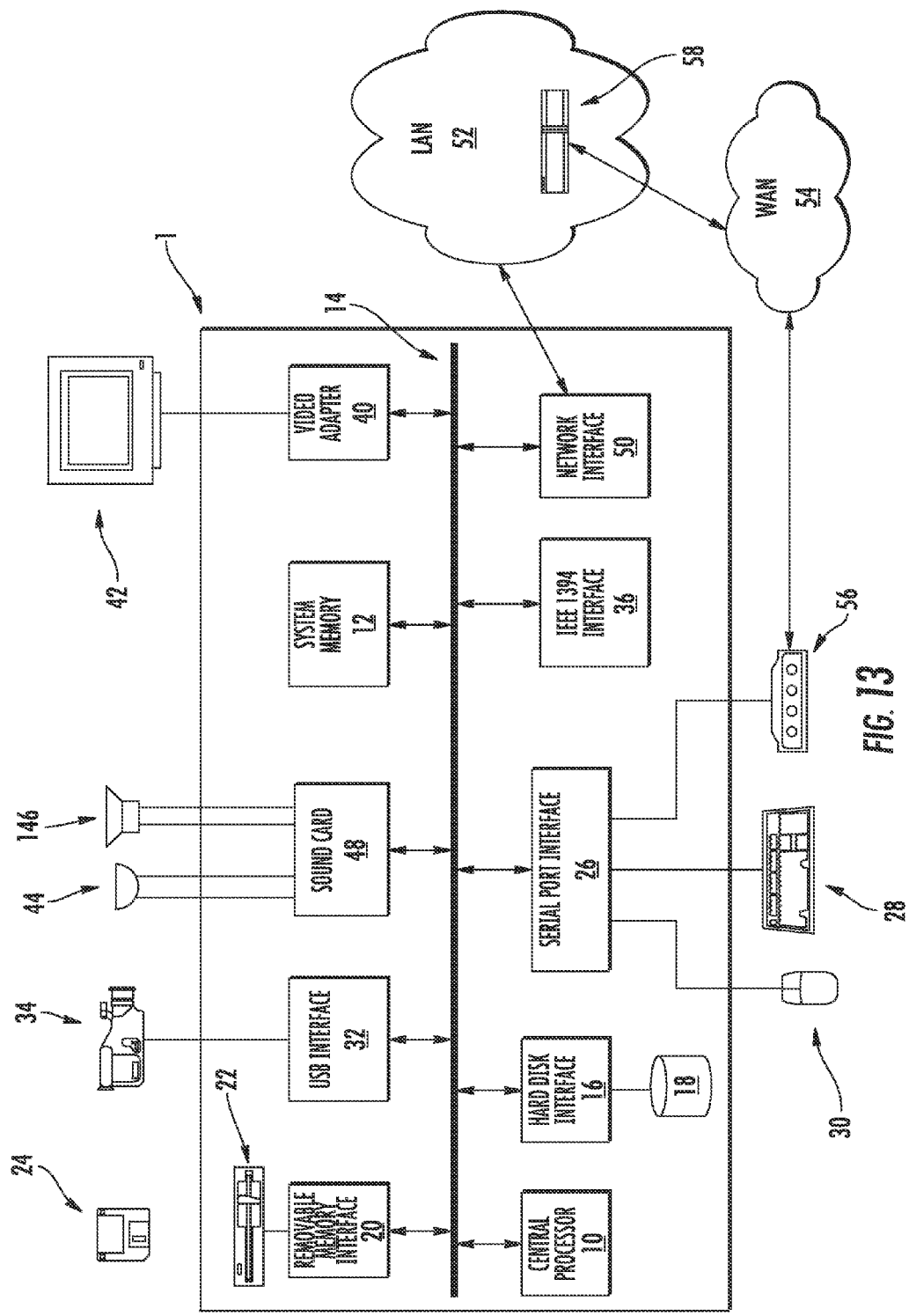
FIG. 13 shows an architecture of a computer system used in altering a face image in accordance with an embodiment of the invention.

FIG. 13 shows computer system 1 that supports an alteration of a face image in accordance with an embodiment of the invention. Elements of the present invention may be implemented with computer systems, such as the system 1. Computer system 1 includes a central processor 10, a system memory 12 and a system bus 14 that couples various system components including the system memory 12 to the central processor unit 10. System bus 14 may be any of several types of bus structures including a memory bus or memory controller, a peripheral bus, and a local bus using any of a variety of bus architectures. The structure of system memory 12 is well known to those skilled in the art and may include a basic input/output system (BIOS) stored in a read only memory (ROM) and one or more program modules such as operating systems, application programs and program data stored in random access memory (RAM).

Computer 1 may also include a variety of interface units and drives for reading and writing data. In particular, computer 1 includes a hard disk interface 16 and a removable memory interface 20 respectively coupling a hard disk drive 18 and a removable memory drive 22 to system bus 14. Examples of removable memory drives include magnetic disk drives and optical disk drives. The drives and their associated computer-readable media, such as a floppy disk 24 provide nonvolatile storage of computer readable instructions, data structures, program modules and other data for computer 1. A single hard disk drive 18 and a single removable memory drive 22 are shown for illustration purposes only and with the understanding that computer 1 may include several of such drives. Furthermore, computer 1 may include drives for interfacing with other types of computer readable media.

A user can interact with computer 1 with a variety of input devices. FIG. 13 shows a serial port interface 26 coupling a keyboard 28 and a pointing device 30 to system bus 14. Pointing device 28 may be implemented with a mouse, track ball, pen device, or similar device. Of course one or more other input devices (not shown) such as a joystick, game pad, satellite dish, scanner, touch sensitive screen or the like may be connected to computer 1.

Computer 1 may include additional interfaces for connecting devices to system bus 14. FIG. 7 shows a universal serial bus (USB) interface 32 coupling a video or digital camera 34 to system bus 14. An IEEE 1394 interface 36 may be used to couple additional devices to computer 1. Furthermore, interface 36 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 1 also includes a video adapter 40 coupling a display device 42 to system bus 14. Display device 42 may include a cathode ray tube (CRT), liquid crystal display (LCD), field emission display (FED), plasma display or any other device that produces an image that is viewable by the user. Additional output devices, such as a printing device (not shown), may be connected to computer 1.

Sound can be recorded and reproduced with a microphone 44 and a speaker 66. A sound card 48 may be used to couple microphone 44 and speaker 46 to system bus 14. One skilled in the art will appreciate that the device connections shown in FIG. 7 are for illustration purposes only and that several of the peripheral devices could be coupled to system bus 14 via alternative interfaces. For example, video camera 34 could be connected to IEEE 1394 interface 36 and pointing device 30 could be connected to USB interface 32.

Computer 1 can operate in a networked environment using logical connections to one or more remote computers or other devices, such as a server, a router, a network personal computer, a peer device or other common network node, a wireless telephone or wireless personal digital assistant. Computer 1 includes a network interface 50 that couples system bus 14 to a local area network (LAN) 52. Networking environments are commonplace in offices, enterprise-wide computer networks and home computer systems.

A wide area network (WAN) 54, such as the Internet, can also be accessed by computer 1. FIG. 7 shows a modem unit 56 connected to serial port interface 26 and to WAN 54. Modem unit 56 may be located within or external to computer 1 and may be any type of conventional modem such as a cable modem or a satellite modem. LAN 52 may also be used to connect to WAN 54. FIG. 13 shows a router 58 that may connect LAN 52 to WAN 54 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 1 can be operated in a client-server configuration to permit a user to retrieve web pages from a web-based server. Furthermore, any of various conventional web browsers can be used to display and manipulate data on web pages.

The operation of computer 1 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In an embodiment of the invention, central processor unit 10 obtains a face image from digital camera 34. A user may view the face image on display device 42 and enter points (e.g., points 606-631 as shown in FIG. 6) to form a mesh that is subsequently altered by central processor 10 as discussed above. The user may identify the points with a pointer device (e.g. mouse 30) that is displayed on display device 42, which overlays the mesh over the face image. With embodiments of the invention, a face image may be stored and retrieved from hard disk drive 18 or removable memory drive 22 or obtained from an external server (not shown) through LAN 52 or WAN 54.

As can be appreciated by one skilled in the art, a computer system (e.g., computer 1 as shown in FIG. 13) with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A computer-implemented method comprising:
    obtaining a before image of a person taken before a portion of the person's body has changed, and an actual after image of the person taken after the portion of person's body has changed;
    applying model parameters to the before image of the person to generate a forecasted after image that predicts how the portion of the person's body will appear after the portion of the person's body has changed;
    comparing the actual after image to the forecasted after image to determine an error between the actual after image and the forecasted after image; and
    adjusting the model parameters based on the error.

2. The method of claim 1, wherein the portion of the person's body comprises the person's face or torso.

3. The method of claim 1, wherein the actual after image represents an image of the person taken after the portion of the person's body has changed due to a health condition, and the forecasted after image represents an image that predicts how the portion of the person's body will appear after the portion of the person's body has changed due the health condition.

4. The method of claim 3, wherein the health condition comprises aging or weight change.

5. The method of claim 1, wherein the before image, the actual after image, and the forecasted after image comprises medical images.

6. The method of claim 1, wherein comparing the actual after image to the forecasted after image further comprises:
    applying a set of points over the actual after image and the forecasted after image; and
    comparing a position of one or more points of the set over the actual after image with a position of one or more corresponding points of the set over the forecasted after image.

7. The method of claim 6, wherein comparing a position of one or more points of the set over the actual after image with a position of one or more corresponding points of the set over the forecasted after image further comprises:
    determining a square error for each corresponding point; and
    assigning a weight to the square error for each corresponding point based on a relative importance of the point.

8. A system comprising:
    one or more computers; and
    a computer-readable medium coupled to the one or more computers having instructions stored thereon which, when executed by the one or more computers, cause the one or more computers to perform operations comprising:

obtaining a before image of a person taken before a portion of the person's body has changed, and an actual after image of the person taken after the portion of person's body has changed;

applying model parameters to the before image of the person to generate a forecasted after image that predicts how the portion of the person's body will appear after the portion of the person's body has changed;

comparing the actual after image to the forecasted after image to determine an error between the actual after image and the forecasted after image; and adjusting the model parameters based on the error.

9. The system of claim 8, wherein the portion of the person's body comprises the person's face or torso.

10. The system of claim 8, wherein the actual after image represents an image of the person taken after the portion of the person's body has changed due to a health condition, and the forecasted after image represents an image that predicts how the portion of the person's body will appear after the portion of the person's body has changed due the health condition.

11. The system of claim 10, wherein the health condition comprises aging or weight change.

12. The system of claim 8, wherein the before image, the actual after image, and the forecasted after image comprises medical images.

13. The system of claim 8, wherein comparing the actual after image to the forecasted after image further comprises:
applying a set of points over the actual after image and the forecasted after image; and
comparing a position of one or more points of the set over the actual after image with a position of one or more corresponding points of the set over the forecasted after image.

14. The system of claim 13, wherein comparing a position of one or more points of the set over the actual after image with a position of one or more corresponding points of the set over the forecasted after image further comprises:
determining a square error for each corresponding point; and
assigning a weight to the square error for each corresponding point based on a relative importance of the point.

15. A non-transitory computer storage medium encoded with a computer program, the program comprising instructions that when executed by one or more computers cause the one or more computers to perform operations comprising:

obtaining a before image of a person taken before a portion of the person's body has changed, and an actual after image of the person taken after the portion of person's body has changed;

applying model parameters to the before image of the person to generate a forecasted after image that predicts how the portion of the person's body will appear after the portion of the person's body has changed;

comparing the actual after image to the forecasted after image to determine an error between the actual after image and the forecasted after image; and adjusting the model parameters based on the error.

16. The computer storage medium of claim 15, wherein the portion of the person's body comprises the person's face or torso.

17. The computer storage medium of claim 15, wherein the actual after image represents an image of the person taken after the portion of the person's body has changed due to a health condition, and the forecasted after image represents an image that predicts how the portion of the person's body will appear after the portion of the person's body has changed due the health condition.

18. The computer storage medium of claim 17, wherein the health condition comprises aging or weight change.

19. The computer storage medium of claim 15, wherein the before image, the actual after image, and the forecasted after image comprises medical images.

20. The computer storage medium of claim 15, wherein comparing the actual after image to the forecasted after image further comprises:
applying a set of points over the actual after image and the forecasted after image; and
comparing a position of one or more points of the set over the actual after image with a position of one or more corresponding points of the set over the forecasted after image.

21. The method of claim 1, further comprising:
after adjusting the model parameters, receiving a before image of a different person; and
applying the adjusted model parameters to the before image of the different person to generate a forecasted after image of the different person.

* * * * *

UNITED STATES PATENT AND TRADEMARK OFFICE
CERTIFICATE OF CORRECTION

PATENT NO.        : 8,014,589 B2
APPLICATION NO.   : 12/851076
DATED             : September 6, 2011
INVENTOR(S)       : Ana Cristina Andres Del Valle Page 1 of 1

It is certified that error appears in the above-identified patent and that said Letters Patent is hereby corrected as shown below:

Title Page, Item (56) Column 2, (Other Publications), Lines 3-5, after "2004, pp. 1- 4." delete "Rowland, D.A...........pp. 1-12." and insert the same on First Page, Col. 2, Line 4, under "Other Publications" as a new entry.

Claim 3, Line 4, Column 12, Line 40, after "due" insert --to--.

Claim 10, Line 4, Column 13, Line 20, after "due" insert --to--.

Claim 17, Line 4, Column 14, Line 21, after "due" insert --to--.

Signed and Sealed this
Eighth Day of November, 2011

David J. Kappos
*Director of the United States Patent and Trademark Office*